US009115508B2

(12) United States Patent
Rapoport

(10) Patent No.: US 9,115,508 B2
(45) Date of Patent: Aug. 25, 2015

(54) FLEXIBLE SEGMENTED SUPPORT STRUCTURE

(71) Applicant: MEDI-MAG LTD., Moshav Ben Shemen (IL)

(72) Inventor: Uri Rapoport, Moshav Ben Shemen (IL)

(73) Assignee: MEDI-MAG LTD., Moshav Ben Shemen (IL)

( * ) Notice: Subject to any disclaimer, the term of this patent is extended or adjusted under 35 U.S.C. 154(b) by 0 days.

(21) Appl. No.: 14/462,664

(22) Filed: Aug. 19, 2014

(65) Prior Publication Data

US 2015/0021213 A1    Jan. 22, 2015

Related U.S. Application Data

(63) Continuation-in-part of application No. 13/202,772, filed as application No. PCT/IL2010/000316 on Apr. 21, 2010, now Pat. No. 8,985,538.

(60) Provisional application No. 61/171,085, filed on Apr. 21, 2009.

(51) Int. Cl.
*A47F 5/00* (2006.01)
*E04H 15/60* (2006.01)
*B60P 7/06* (2006.01)

(52) U.S. Cl.
CPC .. *E04H 15/60* (2013.01); *B60P 7/06* (2013.01)

(58) Field of Classification Search
None
See application file for complete search history.

(56) References Cited

U.S. PATENT DOCUMENTS

| 870,429 | A | | 11/1907 | Grimler | |
|---|---|---|---|---|---|
| 2,759,765 | A | | 8/1956 | Pawley | |
| 2,771,768 | A | * | 11/1956 | Tudor | ............................. 70/457 |
| 2,791,868 | A | * | 5/1957 | Viken | ............................. 446/107 |
| 2,874,812 | A | | 2/1959 | Clevett, Jr. | |
| 3,695,617 | A | | 10/1972 | Mogilner et al. | |
| 3,884,462 | A | * | 5/1975 | Rebajes | .......................... 472/57 |
| 3,900,984 | A | * | 8/1975 | Garelick | ....................... 446/486 |
| 4,037,978 | A | | 7/1977 | Connelly | |
| 4,063,637 | A | | 12/1977 | Danforth | |
| 4,219,958 | A | * | 9/1980 | Shulyak | ........................ 446/487 |
| 4,352,362 | A | | 10/1982 | Nichols | |
| 4,397,145 | A | | 8/1983 | Reist | |
| 4,418,915 | A | | 12/1983 | Calebs | |
| 4,583,956 | A | | 4/1986 | Nelson | |
| 4,637,941 | A | * | 1/1987 | Rochte | .............................. 428/8 |
| 4,675,916 | A | | 6/1987 | Orsini | |
| 4,675,948 | A | | 6/1987 | Bengtsson | |
| 4,739,801 | A | | 4/1988 | Kimura et al. | |
| 4,778,184 | A | | 10/1988 | Fleischer | |
| 4,915,666 | A | * | 4/1990 | Maleyko | ....................... 446/242 |

(Continued)

OTHER PUBLICATIONS

International Search Report and Written Opinion dated Aug. 25, 2010 in related International Application No. PCT/IL2010/000316.

*Primary Examiner* — Monica Millner
(74) *Attorney, Agent, or Firm* — The Law Office of Michael E. Kondoudis

(57) ABSTRACT

An elongated segmented binding cord (SBC) for reversibly housing and securing articles of manufacturing. The SBC reversibly houses and secures objects to a specified location while maintaining a predetermined amount of tension applied on the objects. The SBC includes a main longitudinal axis that includes a plurality of interlockable segments and abutments at opposing ends. Each abutment is adapted to at least reversibly attach at the specified location.

36 Claims, 13 Drawing Sheets

(56) References Cited

U.S. PATENT DOCUMENTS

| | | | |
|---|---|---|---|
| 4,979,531 A | 12/1990 | Toor et al. | |
| 4,986,457 A | 1/1991 | Faris | |
| 4,997,375 A | 3/1991 | Heinz | |
| 5,110,315 A | 5/1992 | Zawitz | |
| 5,224,959 A * | 7/1993 | Kasper | 482/114 |
| 5,333,634 A | 8/1994 | Taylor | |
| 5,525,089 A | 6/1996 | Heinz | |
| 5,531,364 A | 7/1996 | Buis | |
| 6,241,572 B1 | 6/2001 | Braginsky | |
| 7,802,582 B2 * | 9/2010 | Livacich et al. | 135/147 |
| 8,753,360 B2 | 6/2014 | Gleiman et al. | |
| 2008/0006317 A1 | 1/2008 | Livacich et al. | |

* cited by examiner

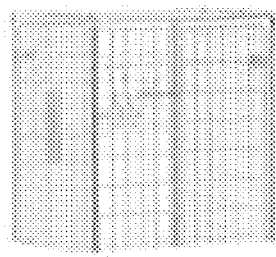
*Fig. 1e*
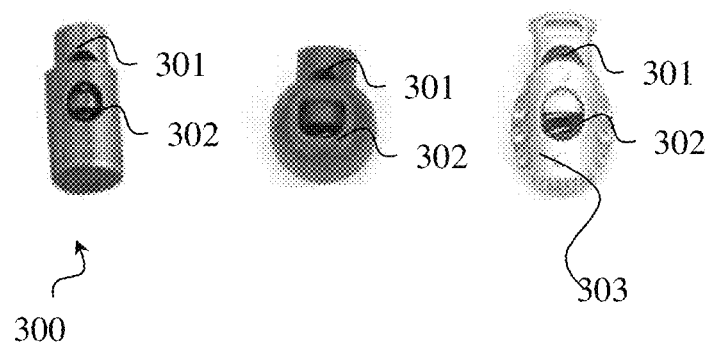
*Fig. 2 – Prior art*

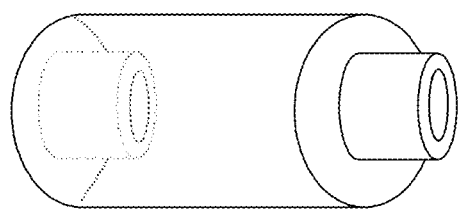
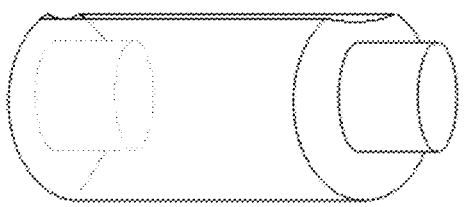
Fig. 8a Fig. 8b
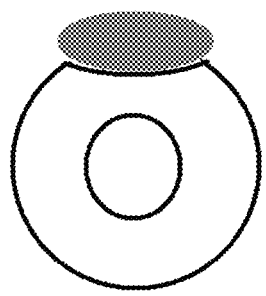
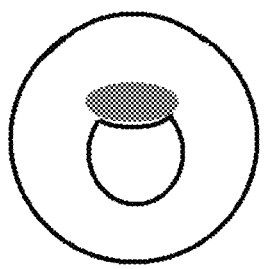
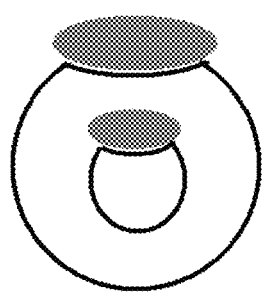
Fig. 8c Fig. 8d Fig. 8e
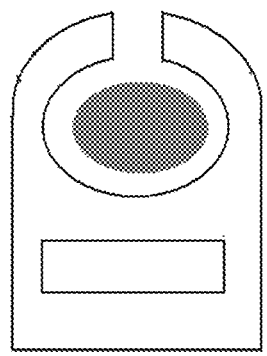
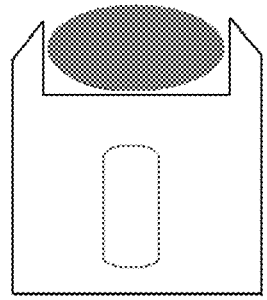
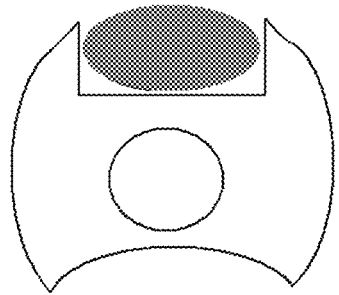
Fig. 8f Fig. 8g Fig. 8h

FLEXIBLE SEGMENTED SUPPORT STRUCTURE

CROSS-REFERENCE TO RELATED APPLICATIONS

This application is a continuation-in-part of application Ser. No. 13/202,772, filed Aug. 23, 2011, which is the National Stage of International Application No. PCT/IL2010/000316, filed Apr. 21, 2010, which claimed the benefit of U.S. Provisional Patent Application No. 61/171,085, filed Apr. 21, 2009.

FIELD OF THE INVENTION

The present invention relates to a method and device useful e.g., for securing articles of manufacturing upon a bicycle rack, for securing items in confined volumes etc.

BACKGROUND OF THE INVENTION

Flexible segmented structures are used to good effect for example in collapsible tent poles. A set of hollow generally tubular bodies are attached by means of ferrules, and are pulled together by means of an elastic cord running through the tubes.

For example, U.S. Pat. No. 4,979,531 provides a flexible, multi-segmented support structure particularly suited for use as a tent pole, wherein the support structure includes a plurality of tubular segments and each segment is connected to its adjacent segment or segments by lengths of elastic shock cord, the cord having sleeves affixed to each end thereof which can be affixed in partly or fully automated fashion to the respective segments. A novel ferrule is included to provide rigidity at the junctions of the segments, without providing undue stress concentration and to further assist in automating the manufacturing process.

While this device is as stated useful for tents and the like, it will be appreciated that the ferrules are not adapted to provide different attachment angles. Furthermore, a structure composed of such linear segments will not provide substantial crush protection or lateral support.

Therefore, there is still a long felt need for a structure that can reversibly house and secure objects to a predetermined location whilst maintaining predetermined amount of tension applied on the objects. Furthermore, there is still a long felt need for a structure that can reversibly house and secure objects whilst maintaining predetermined bending characteristics.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIGS. 1a-1e demonstrate various cord-like 1D, net-like 2D and case-like 3D structures of the SBC structure according to an embodiment of the present invention;

FIG. 2 present a set of commercially available cord locks from the prior art;

in FIG. 7b the ligament id positioned within the segment while in FIG. 7c the ligament is positioned externally to the segment;

FIGS. 8a-8h demonstrate perspective views and cross sections of various ligament-segment configurations according to another embodiment of the present invention;

BRIEF SUMMARY

Figure 1A:
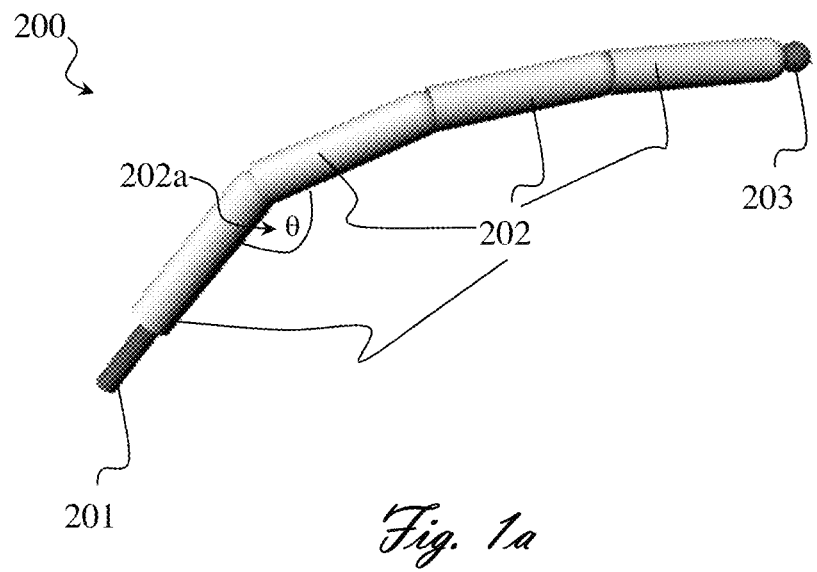

It is according to one object of the invention to disclose A 3D segmented structure for reversibly and at least partially housing at least one item in a confined volume, comprising n elongated segmented binding cords; each of which comprising a plurality of interlockable segments; n is an integer greater than 1; m conjugating means; m is an integer greater than or equal to 1; each of the m conjugating means comprises o arms; o is an integer greater than 1; wherein each of the m conjugating means is configured for interlocking o elongated segmented binding cords together to form the 3D segmented structure; further wherein the 3D segmented structure is reversibly transformable from a LOOSE (non-arched) configuration to a TIGHTENED (arched) configuration, such that the at least one item is at least partially housed within the 3D segmented structure in the TIGHTENED (arched) configuration It is still in the scope of the invention wherein the 3D segmented structure is characterized by being a 3D flexible and collapsible structure.

It is still in the scope of the invention wherein the TIGHTENED (arched) configuration forms a structure selected from a group consisting of case-like 3D segmented structure, basket-like 3D segmented structure, container-like 3D segmented structure, suitcase-like 3D segmented structure, a shell-like 3D segmented structure, helmet-like 3D segmented structure and any combination thereof.

It is still in the scope of the invention wherein at least one of the elongated segmented binding cords further comprises at its ends at least two abutments provided at at least one first end, and at least one second opposite end; each of the abutments is reversibly attachable to a predetermined location.

It is still in the scope of the invention wherein the aforementioned elongated segmented binding cords are characterized by the tightened configuration wherein at least two subsequent the interlockable segments are respectively tilted in an angle θ between; angle θ is adapted to provide the elongated segmented binding cords with predetermined tighten arched characteristics.

It is still in the scope of the invention wherein at least one of the elongated segmented binding cords is characterized by a main longitudinal axis; and additionally comprises at least one ligament, provided along the main longitudinal axis.

It is still in the scope of the invention wherein the ligament is made of materials being either flexible or rigid.

It is still in the scope of the invention wherein the ligament is positioned externally to at least one of the segments.

It is still in the scope of the invention wherein the ligament is positioned internally to, within and throughout at least one of the segments.

It is still in the scope of the invention wherein the elongated segmented binding cord additionally comprises ligament-shortening-means; a member of a group consisting of the effective distance between the segments, the effective length of the ligament and any combination thereof is reversibly minimizable or otherwise shortenable by the ligament-shortening-means.

It is still in the scope of the invention wherein the ligament-shortening-means is configured to provide a predetermined amount of tension applied on the at least one item.

It is still in the scope of the invention wherein the ligament-shortening-means is a ratchet-like mechanism, especially a mechanism located at one end of at least one of the elongated segmented binding cords.

It is still in the scope of the invention wherein the elongated segmented binding cords as mentioned above comprising at least one interlocking means adapted to connect segments which are adjacent to one another, selected from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is still in the scope of the invention wherein the above mentioned structure additionally comprising at least one ligament-securing means adapted to secure the at least one ligament to the at least one elongated segmented binding cord such that unthreading of the at least one ligament is preventable.

It is still in the scope of the invention wherein the conjugating means is selected from a group consisting of cord locks, male-female connecting means, magnetic means, hooks, ratchets, grapples, hooks-and-loops known as the commercially available Velcro™ product, snaps, buttons, screws, lanyards, magnets, snap hooks, spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is still in the scope of the invention wherein the o arms are located on positions selected from the group comprising of on the same plane, on different planes and any combination thereof.

It is still in the scope of the invention wherein the length of at least one of the o arms is substantially equal or substantially different than another one of the o arms.

It is still in the scope of the invention wherein the angle between at least one pair of the o arms is substantially equiangular or substantially non-equiangular to the angle between another pair of the o arms.

It is still in the scope of the invention wherein the at least one ligament is rigid and is selected from a group consisting of polymeric materials, especially nylons, polyamides, plastics, composite materials, stainless steel, metal ware or a combination thereof.

It is still in the scope of the invention wherein the at least one ligament is flexible and is selected from a group consisting of polymeric materials, plastics, rubbers and rubber-like materials, elastic materials, metallic springs or a combination thereof.

It is another object of the invention to provide a method for reversibly and at least partially housing at least one item in a confined 3D segmented structure comprising steps of: providing n elongated segmented binding cords, each of which is characterized by a main longitudinal axis and with a plurality of interlockable segments; n is an integer greater than 1; providing the elongated segmented binding cords with m conjugating means; m is an integer greater than or equals to 1; each of the m conjugating means comprises at least o arms; o is an integer greater than 1; and, interlocking o elongated segmented binding cords together with the o conjugating means arms, thereby forming a 3D segmented structure; and reversibly transforming the 3D segmented structure from a LOOSE (non-arched) configuration to a TIGHTENED (arched) configuration, thereby at least partially housing the at least one item in the 3D segmented structure in the TIGHTENED (arched) configuration.

It is still in the scope of the invention wherein the aforementioned method further comprising step of providing the 3D segmented structure as a 3D flexible and collapsible structure.

It is still in the scope of the invention wherein the aforementioned method further comprising step of selecting the TIGHTENED (arched) configuration structure from a group consisting of case-like 3D segmented structure, basket-like 3D segmented structure, container-like 3D segmented structure, suitcase-like 3D segmented structure, shell-like 3D segmented structure, helmet-like 3D segmented structure and any combination thereof.

It is still in the scope of the invention wherein the step (c) of the aforementioned method is characterized by forming a TIGHTENED (arched) configuration structure wherein at least two subsequent segments are respectively tilted in an angle θ between; angle θ is adapted to provide the elongated segmented binding cords with predetermined tighten arched characteristics.

It is still in the scope of the invention wherein the aforementioned method further comprising the step of locating the o arms on positions selected from the group comprising of on the same plane, on different planes and any combination thereof.

It is still in the scope of the invention wherein the aforementioned method further comprising the step of setting the length of at least one of the o arms to be substantially equal or substantially different than another one of the o arms.

It is still in the scope of the invention wherein the aforementioned method further comprising the step of setting the angle between at least one pair of the o arms to be substantially equiangular or substantially non-equiangular to the angle between another pair of the o arms.

It is still in the scope of the invention wherein the aforementioned method further comprising steps of: providing at least one of the elongated segmented binding cords at its ends at least two abutments located at at least one first end, and at least one second opposite end; each of the abutments is adapted to reversibly attach a predetermined location; reversibly affixing the at least two abutments to the predetermined location, thereby securing the at least one elongated binding cord to the predetermined location;

It is still in the scope of the invention wherein the aforementioned method further comprising a step of threading a ligament through or along at least two segments of at least one of the elongated segmented binding cords.

It is still in the scope of the invention wherein the aforementioned method further comprising a step of selecting the ligament to be made of materials being either flexible or rigid.

It is still in the scope of the invention wherein the step of threading a ligament of the aforementioned method is provided by threading the ligament to a position externally to at least one of the segments.

It is still in the scope of the invention wherein the step of threading a ligament is provided by threading the ligament to a position internally to, within and throughout at least one of the segments.

It is still in the scope of the invention wherein the aforementioned method further comprising a step of securing the at least one ligament to the at least one elongated segmented binding cord with a ligament-securing means, thereby preventing unthreading of the at least one ligament.

It is still in the scope of the invention wherein the aforementioned method further comprising steps of: providing the elongated segmented binding cords with ligament-shortening means; and reversibly minimizing or otherwise shortening the ligament by the ligament-shortening-means.

It is still in the scope of the invention wherein the aforementioned method further comprising a step of configuring the ligament-shortening-means to provide a predetermined amount of tension applied on the at least one item.

It is still in the scope of the invention wherein the aforementioned method further comprising a step of providing the ligament-shortening-means as a ratchet-like mechanism, especially locating the mechanism at one end of at least one of the elongated segmented binding cords.

It is still in the scope of the invention wherein the aforementioned method further comprising step of connecting the elongated segmented binding cords through interlocking means selected from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is still in the scope of the invention wherein the aforementioned method further comprising step of selecting the conjugating means from a group consisting of cord locks, male-female connecting means, magnetic means, hooks, ratchets, grapples, hooks-and-loops known as the commercially available Velcro™ product, snaps, buttons, screws, lanyards, magnets, snap hooks, spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is still in the scope of the invention wherein the aforementioned method further comprising step of selecting the ligament to be rigid from a group consisting of polymeric materials, especially nylons, polyamides, plastics, composite materials, stainless steel, metal ware or a combination thereof.

It is lastly in the scope of the invention wherein the aforementioned method further comprising step of selecting the ligament to be flexible from a group consisting of polymeric materials, plastics, rubbers and rubber-like materials, elastic materials, metallic springs or a combination thereof.

DETAILED DESCRIPTION

The following description is provided, alongside all chapters of the present invention, so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide a flexible segmented support structure.

The term 'plurality' refers hereinafter to any non-zero integer and greater than 1, e.g., 2-10, 10-200 etc.

It is according to one embodiment of the invention, wherein an elongated segmented binding cord (SBC) for reversibly housing and securing articles of manufacturing to their predetermined location is disclosed. In analogy to arch-bridge, e.g., a Roman arch bridge, the SBC is constructed with abutments at each end shaped as a curved arch. Hence, the SBC work by transferring the weight of the SBC, its loads, or a loading externally provided on the SBC, partially into a horizontal thrust restrained by the abutments at either side. According to various embodiments of the invention, the SBC comprises several interconnected segments. The load at the top of the segments makes each segment on the arch of the SBC press on the one next to it. This happens until the push is applied to the end supports or abutments, which are embedded in the basis of the arch, and accordingly, the basis around the abutments is squeezed and pushes back on the abutments.

The SBC is characterized by a main longitudinal axis (MLA) along which at least one ligament is provided. The SBC comprised of a plurality of N interlockable segments, N is an integer equals to or higher than two. The SBC is adapted to be reversibly transformed from a LOOSE (non-arched) configuration to a TIGHTENED (arched) configuration and vice versa. In the loose configuration, there is no effective pressure upon the segments and the SBC is relatively flexible. In this configuration, there is an effective distance between the segments. In the tightened configuration, however, there is an effective pressure upon the segments and the SBC is relatively rigid. Here, the segments are very close to each other in a way that there isn't an effective distance between them.

The segments are shaped (e.g., and in a non-limiting manner, shaped by means of shape, size or a bending mechanism) to form am arch with a preset characteristics upon applying the pressure. According to an embodiment of the invention, at least two neighboring segments are positioned in a manner that characterizes an angle $\theta$ of a preset range. Angle $\theta$ is adapted to provide the tightened SBC with predetermined arched characteristics. Angle $\theta$ may vary from segment to segment and is ranging e.g., form 0° to 180°. Hence, in order to maintain an arch-like rigid structure, angle $\theta$ may approximately equal to 30° in an SBC of six segments, and similarly, angle $\theta$ may equal 20° wherein N=9. Alternatively, still in a non-limiting manner, in order to maintain an shell-like rigid structure, angle $\theta$ may approximately equal to 30° in an SBC of 12 segments, and similarly, angle $\theta$ may equal 20° wherein N=18.

It is according to yet another embodiment of the invention, wherein at least one of the segments is provided with interlocking means adapted to connect an $n^{th}$ segment to (a) the $(n+1)^{th}$ segment; or to (b) both $(n-1)^{th}$ and $(n+1)^{th}$ segments. The initial distance between the segments is alterable such that the curvature of at least two of the segments along MLA is limited to a predetermined bending characteristics to arch the SBC, e.g., by means of curving the segments in angle θ, as defined above.

The term 'effective distance' refers to the applicable distance between an $n^{th}$ segment to (a) the $(n+1)^{th}$ segment; or to (b) both $(n-1)^{th}$ and $(n+1)^{th}$ segments which provides the SBC to be rigidly affixed in its tightened configuration. The distance may vary from e.g., few micrometers to a scale of e.g., millimeters, as function, for example, of the segments geometry, size and compositions.

As defined above, the SBC is constructed with abutments at each end shaped as a curved arch. It is according to another embodiment of the invention wherein at least the first segment in one end of the SBC and at least the first segment on the opposite end of the SBC are the abutments; being in physical connection with the location the SBC is to be secured.

The effective distance between the segments is reversibly alterable, for example by utilizing various means for shortening the effective length of the ligament, and minimizing the effective distance between the segments. One of those means are interlocking means, which are selected in a non-limiting manner from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof. Hence for example, a ratchet, hand tool or automated tool containing a toothed wheel that can only move in one direction is used for (i) shortening the ligament or otherwise reducing the effective distance between the segments and/or (ii) affixing the ligament length and the effective distance at the time the SBC is used.

It is according to another embodiment of the invention, wherein the SBC is provided in its tightened (arched) configuration when one or more (e.g., both sides of the elongated SBC) portions of the SBC are immobilized or otherwise connected to a predetermined location, surface or carrying device. When well anchored to the surface, the ligamented segments maintain a predetermined amount of tension applied on the articles of manufacturing clasped by the SBC and hence securing the articles of manufacturing to their location.

Reference is made now to FIG. 1a which illustrates in an out-of-scale manner one general embodiment of an elongated segmented binding cord (SBC) 200 according to the present invention. SBC 200 is characterized by a main longitudinal axis (MLA) along which at least one ligament 201 is provided. SBC 200 comprises of a plurality of N interlocked segments 202, in which N is an integer equal or higher than two, here N equals 4. FIG. 1a discloses an SBC where ligament 201 is accommodated within each of segments 202. It is well in the scope of the invention wherein ligament 202 is provided externally to the segments, as will be shown downwards e.g., in FIG. 5, FIG. 7c, FIGS. 8a-h, FIG. 9a-b, FIG. 10 etc.

According to the embodiment presented in FIG. 1a, each two neighboring segments 202 are characterized by angle θ 202a. Angle θ is adapted to provide the SBC with predetermined bending characteristics to form a rigid arch-structure.

According to one embodiment, ligament 201 is flexible and tends to draw all members 202 together while maintaining constant tension. Flexible ligament is made e.g., by rubber-like materials, or consists of spring-like configurations. According to alternative embodiment, ligament 201 is at least partially rigid, i.e., non-flexible and tends to draw all segments 202 together when shorten. Non-flexible ligament is made e.g., by polymeric materials, Nylons of other polyamides etc., or stainless steel etc.

Still referring FIG. 1a, a set of four tubular segments is shown. In this embodiment, the connection between each two segments 202 is provided by interlocking means, which according to an embodiment of the invention, can be based upon a ball-and-socket joint, allowing for universal (yet limited one) rotation of each segment with respect to its neighbor.

According to an alternative embodiment of the present invention, the end of the flexible ligament is kept from slipping through the segments 202 by means of a flexible ligaments-securing means 203. The ligaments-securing means 203 are adapted to secure the ligaments to the SBC such that unthreading of the flexible ligaments is obtained.

According to an embodiment of the present invention, the SBC is used for reversibly housing and securing articles of manufacturing to a predetermined location. An example of use is to attach and protect objects upon a car roof or a bicycle basket. According to that embodiment, the SBC additionally comprises at least one fastening-securing means (see e.g., FIG. 11a-b and FIG. 12) for fastening the SBC to the predetermined location.

Figure 1B:
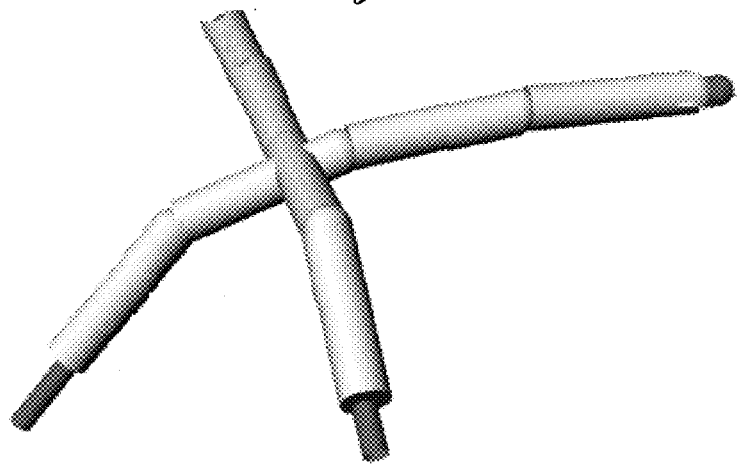

Reference is now made to FIG. 1b disclosing in an out-of-scale manner a conjugate comprises of two SBCs. By attaching several such SBC 200 together, a mesh or web can be formed as seen in FIGS. 1c and 1d.

Figure 1C:
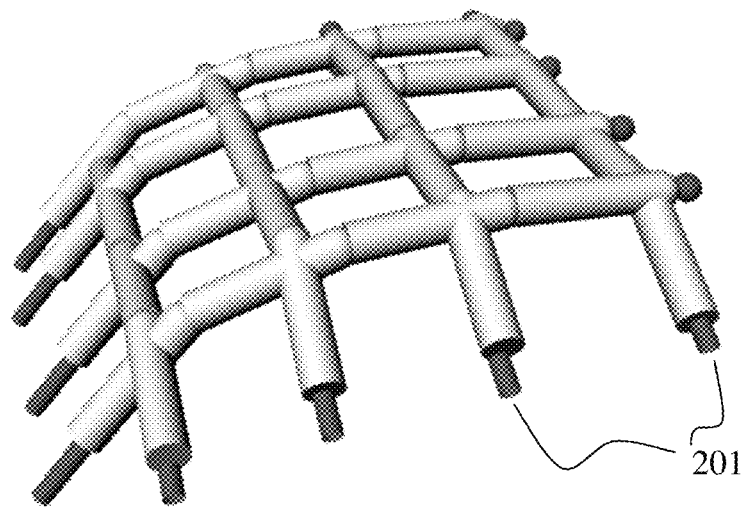
Figure 1D:
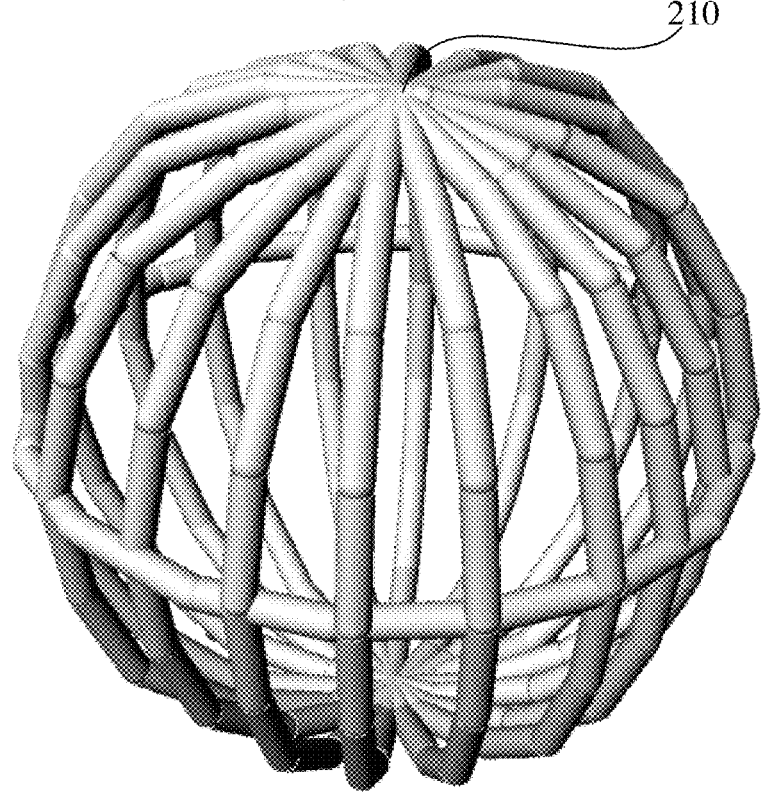

FIG. 1c illustrates a two-dimension (2D) or three-dimension (3D) network which comprises a plurality of SBCs. This article of manufacture can be used, for example, to attach and protect objects upon a car roof or a bicycle basket. In these cases, the mesh forms a surface that mates with a pre-existing surface such as the roof of a car in order to enclose objects in the volume between the two surfaces. FIG. 1d illustrates a 3D shell, basket, container, suitcase or the like, which comprises inter alia a plurality of conjugated or either directly- or indirectly-connected SBCs. The 2D structure may comprise, according to the shown embodiment, a plurality of abutments connecting the SBC to the ground and facilitating the tight arch-like fastened structure. The 3D structure may comprise, according to the shown embodiment, a plurality of interconnected abutments, facilitating the tight sphere-like fastened structure. The shape of sphere may be regular or irregular, ball-like (See FIG. 1d), box-like (See FIG. 1e) or a combination thereof.

Alternatively, a single cord-lock (ligament fastener) can be utilized, while the other end is kept under a variable tension by means of a movable holding member such as a spring-loaded clamp or cord-lock, as may be familiar to users of clothing with drawstrings or sleeping bags with similar drawstrings, these often being provided with spring-loaded clamps. Examples of such commercially available cord locks 300 are shown in FIG. 2. These generally consist of coaxial bodies, the inner of which 301 can slide within the outer 302. The inner and outer bodies are provided with holes through which a cord is threaded. The inner body is pushed out of the outer body by means of a spring 303, which causes the cord to become clamped between the holes of the outer and inner bodies. Obviously a great number of variations on this means for clamping the elastic member securely are possible, including but not limited to screws, spring-loaded clamps, ratchets, Velcro™, and the like as will be obvious to one skilled in the art. If the tensioning member takes the form of an elastic band, amongst others, and the end-cap used is a cord-lock device as described above, the tension on the net will be released when the elastic band is released from under tension.

According to another embodiment of the present invention, the flexible ligament is not threaded through the segment, but coupled to each segment, preferably upon the interlocking means.

According to that embodiment, each segment 202 of the SBC is provided with interlocking means 204 adapted to connect an n segment to (a) the n+1 segment; or to (b) both n−1 and n+1 segments. Each of the interlocking means is provided with at least one flexible or rigid ligament coupled to it.

As described above, each two neighboring segments are characterized by an angle θ. Angle θ together with the ligament are adapted to provide the SBC with predetermined bending characteristics so as to form an arch secure structure when the SBC is tightened. Furthermore, as described above, the segments maintain a predetermined amount of tension applied on articles of manufacturing housed within the SBC and hence securable accommodating the articles of manufacturing within a tightened structure.

Figure 3A:
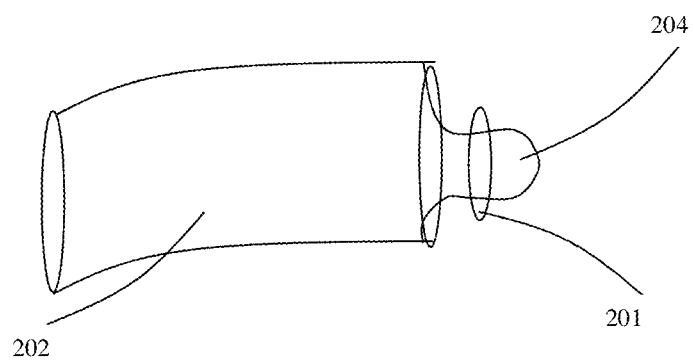
FIGS. 3a-3b demonstrate another embodiment of the segments 202 of the SBC.
Figure 3B:
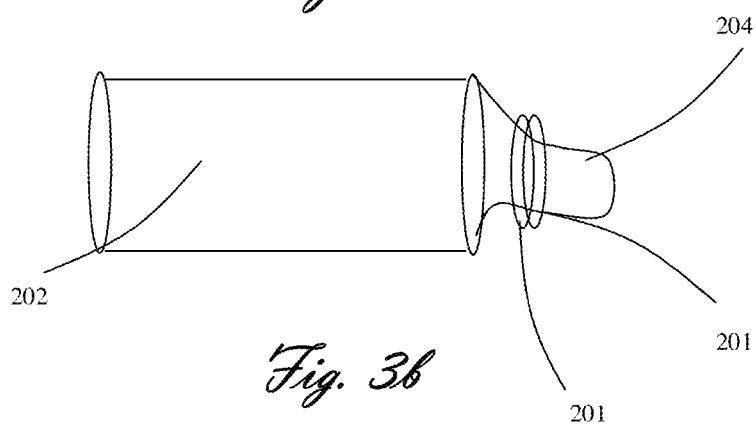

Such an embodiment is illustrated in FIG. 3a. Each segment 202, as mentioned above, contains interlocking means 204 (which in FIG. 3a are a ball and socket joint) upon which at least one flexible ligament 201 is coupled. FIG. 3a illustrates one flexible O-ring-type ligament 201 and FIG. 3b illustrates an embodiment at which two flexible O-ring-type or coil-type ligaments 201 are used. In FIG. 3a, the body of the segment is curved, so that the SBC will arch at its tightened configuration. In FIG. 3b, however, the body of the segment is not curved, while coupling member 204 is curved or otherwise tilted in respect to the segment's MLA.

According to one embodiment of the present invention, flexible ligament 201 can be O-ring, Silicon member, coil, or other flexible, compressible or foamy material, at least partially circling the coupling means.

The embodiment described above can be used, for example, to attach and protect objects upon a car roof or a bicycle basket. In these cases, the mesh forms a surface that mates with a pre-existing surface such as the roof of a car in order to enclose objects in the volume between the two surfaces.

Figure 4A:
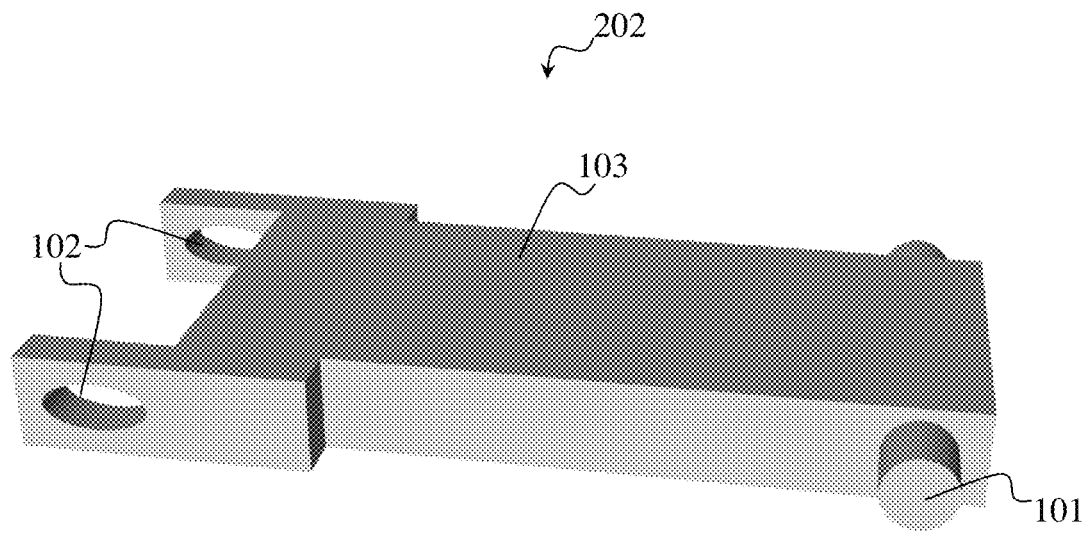
FIGS. 4a-4c demonstrate possible 1D-3D embodiments of the SBC provided by the present invention.

Reference is now made to FIGS. 4a-4d demonstrate another embodiment of the segments 202 of the SBC structure. As can be seen in FIG. 4a, the single interlocked segment is provided with a rigid body 103, a pin 101 and elliptic pin holders 102. The pin holders are formed as part of the body 103 and are adapted to hold a pin 101 of an adjacent segment while allowing rotation around the longitudinal axis of the pin whilst facilitating the tightened configuration of the SBC.

Figure 4B:
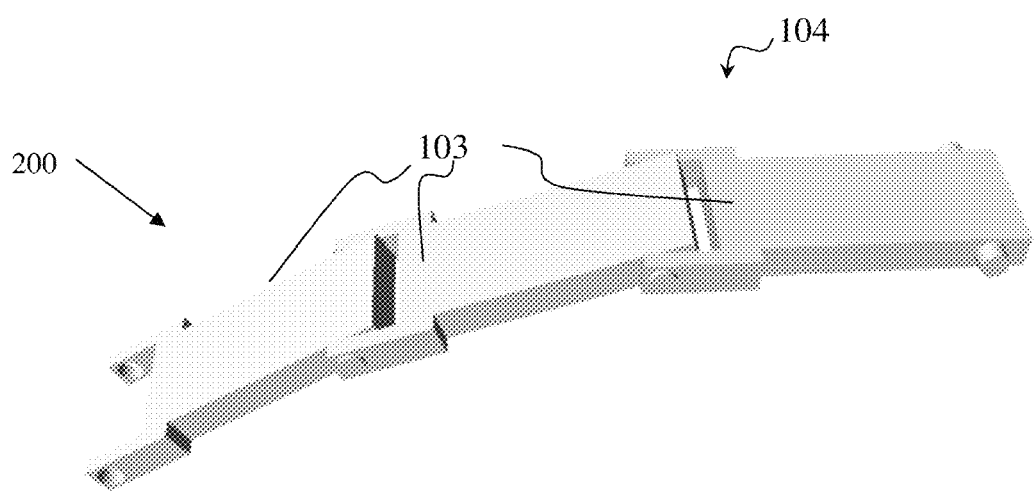

FIG. 4b illustrates the elongated segmented binding cord (SBC) 200 which comprises several such segments coupled together. In the figure the segments are slightly rotated with respect to one another. This arrangement is mechanically akin to that of a bicycle chain. Certain modifications of this device greatly amplify its usefulness. First of all, provision can be made to limit the angular travel available to one segment with respect to its neighbor. Once an $n^{th}$ segment comes into contact with n+1$^{th}$ segment, it will not rotate further, and its rotational travel is therefore limited to a degree determined simply by the geometry of the segments. In other words, each two neighboring segments are characterized by an angle θ. The angle θ is adapted to provide the entire structure with predetermined bending characteristics such that the curvature of at least a portion of the segments along the MLA is limited. This well-secured tighten configuration is provided by means of ligament (not shown) which applies a pressure upon the segments and ensure the arch-structure of the SBC.

Figure 4C:
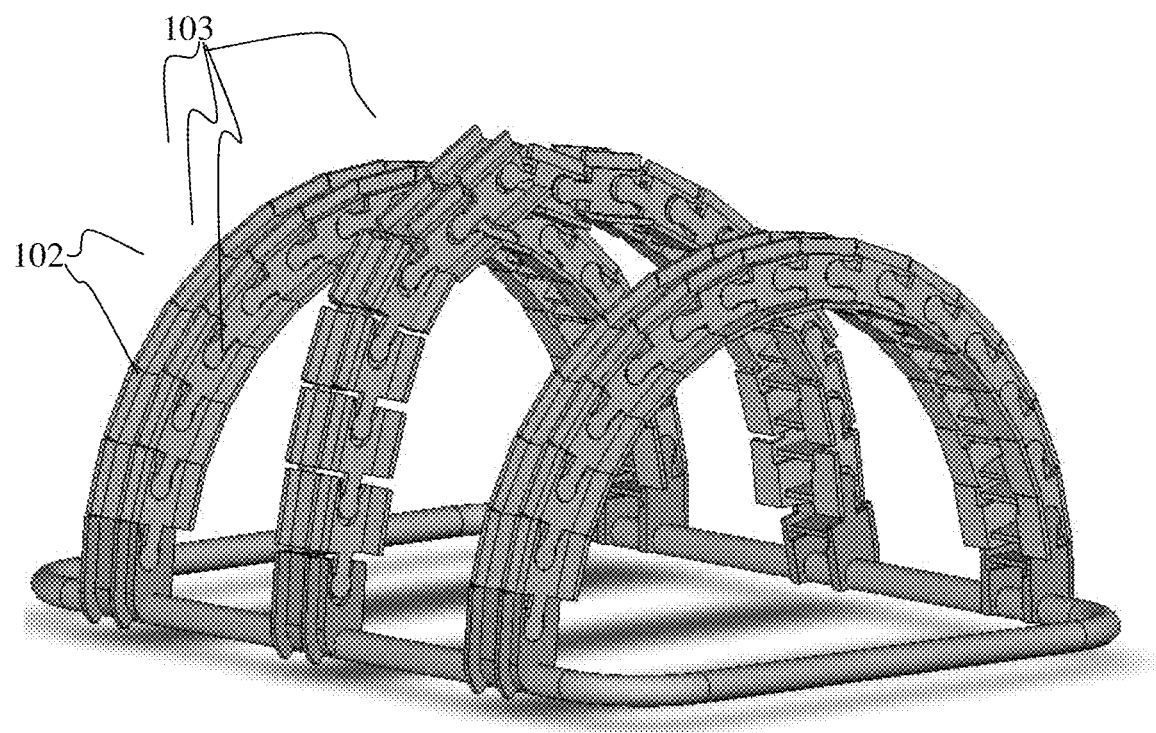

FIG. 4c illustrates a set of three 3D arched SBCs. The tightened ligament provided on the top portion of the segments is not shown.

Figure 5:
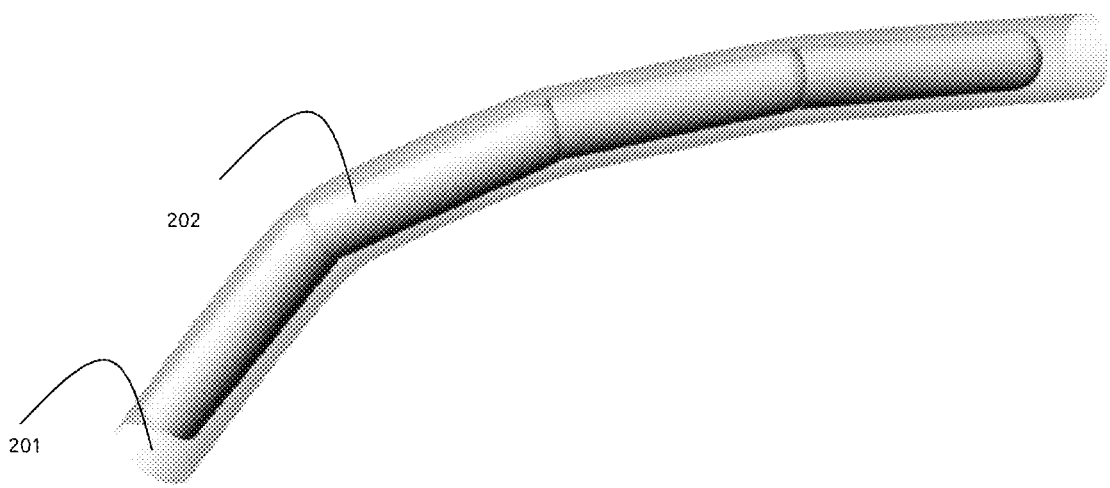
FIG. 5 demonstrates another SBC (i.e., a ligamenting lumen located at the outer surface of the segments) according to another embodiment of the present invention.

Reference is now made to FIG. 5, illustrating another embodiment of the present invention in which the ligament 201 is provided externally to segments 202. As an example and in a non-limiting manner, a shortenable flexible lumen can be use.

Figure 6A:
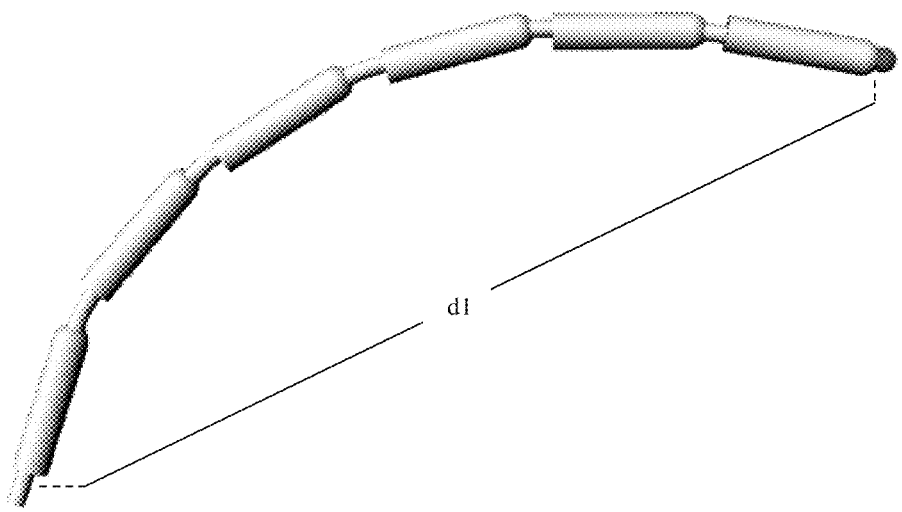
FIGS. 6a-6b demonstrate an SBC according to another embodiment of the present invention.
Figure 6B:
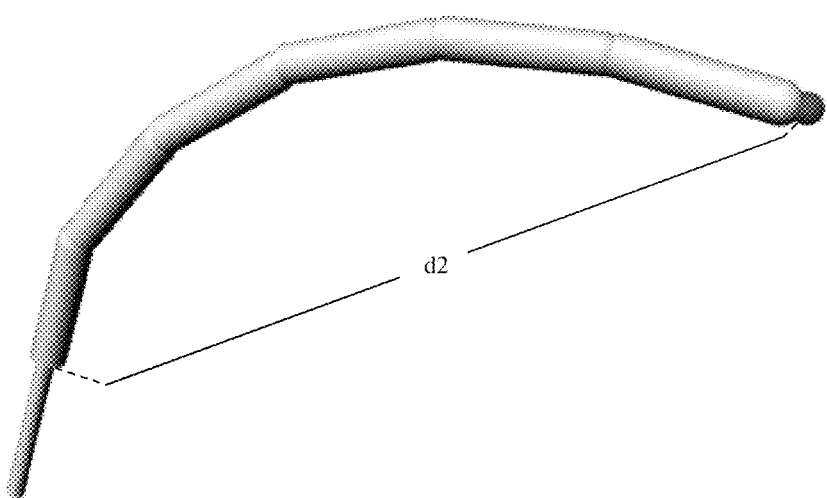
Figure 7A:
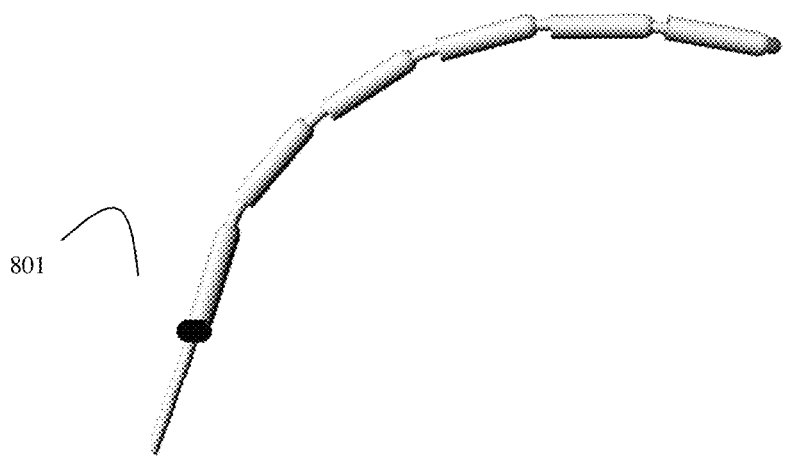
FIGS. 7a-7c demonstrate an SBC according to another embodiment of the present invention.
Figure 7B:
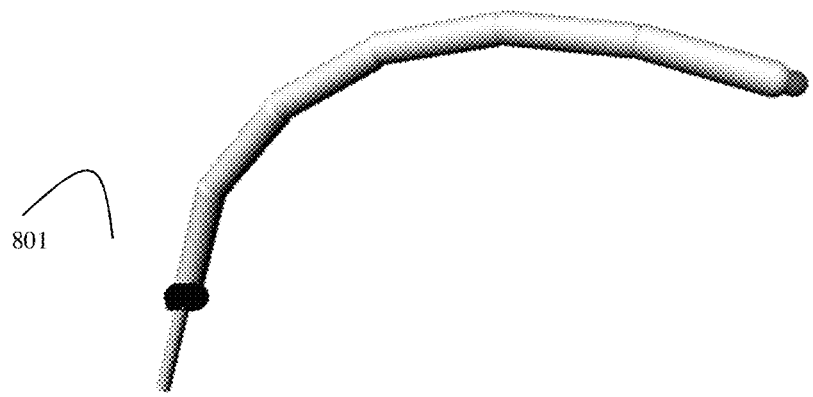
Figure 7C:
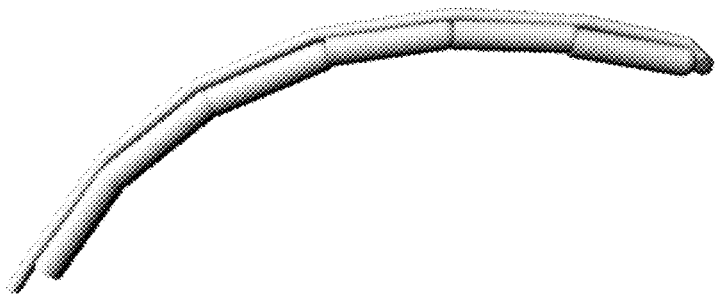

Reference is now made to FIGS. 6a,b-7a,b, illustrating another embodiment of the present invention in which the ligament is either flexible or rigid. In FIG. 6a the segments are characterized by an initial distance $d_1$ (i.e., loosened configuration). By shortening said distance via the securing means (e.g., spring-loaded clamps or cord-locks) to a distance $d_2$ (FIG. 6b) the segments curve according to predetermined bending characteristics. FIGS. 7a,b presents the same, wherein the SBC comprises a cord-lock 801 (ligament fastener) as described in FIG. 2.

Reference is now made to FIGS. 8a-8h illustrating in an out-of-scale and non-limiting manner various possible embodiments of the invention. FIG. 10a shows a perspective view of a single (here, e.g., tubular shaped-) segment, adapted to accommodate a ligament within the outer shell of the segment. FIG. 8b depicts a perspective view of another single segment, adapted to accommodate a ligament outside (i.e., top crescent recess) the shell of the segment. FIG. 8c presents a cross section of the FIG. 8b embodiment. The gray section represents a ligament positioned outside the shell of the segment, in the well-defined outer top crescent recess. FIG. 8d presents another embodiment of the invention, namely the ligament (see gray section) positioned within the shell of the segment, in the well-defined inner positioned top crescent recess. According to this embodiment, a flexible ligament, if used, well accommodated within the secure boundaries of the segments, so that a dangerous backlash of the ligament is avoided. FIG. 10e presents a cross section a combine version of the SBC, wherein both inner and outer ligaments are utilized (e.g., a rigid external first ligament and flexible inner second ligament). The shape, size, cross section, and details of the at least a portion of the segments may vary, as defined in an illustrative manner in FIGS. 10f-10h.

Figure 9A:
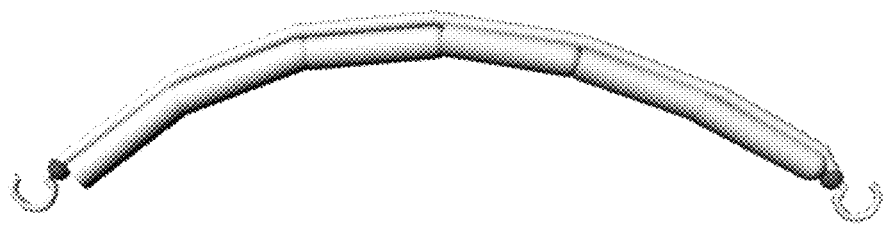
FIGS. 9a-9b demonstrate perspective views of cord-like and net-like SBCs with hooks as effective abutments according to another embodiment of the present invention.
Figure 9B:
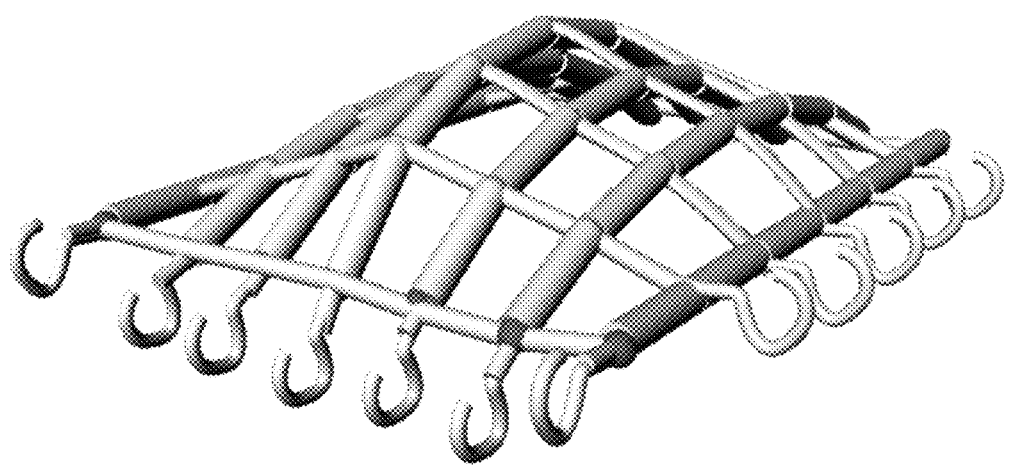

Reference is now made to FIGS. 9a-9b illustrating in an out-of-scale and non-limiting manner various possible embodiments of the invention, namely a linear cord-like structure and 2D net-like structure (FIG. 9a and FIG. 9b, respectively). Here, abutments of the arched SBC are hook-like members, adapted to reversibly anchor both opposite sides of the SBC and provides it secured arched configuration.

Figure 10:
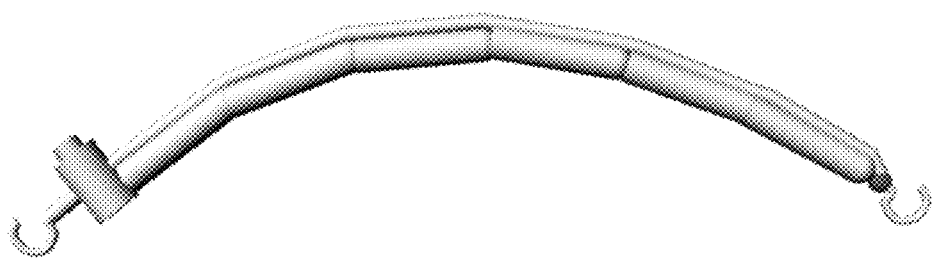
FIG. 10 demonstrates perspective view of cord-like SBCs with hooks, external ligament and ligament shortening means, according to yet another embodiment of the present invention.

Reference is now made to FIG. 10 disclosing in an out-of-scale and non-limiting manner another embodiment of the invention: the arched SBC comprises two hooks (abutments), shortanable segments-pressing ligament, positioned externally (top wise position) to the segments, and a simple to operate ligament-shortening means.

Figure 11:
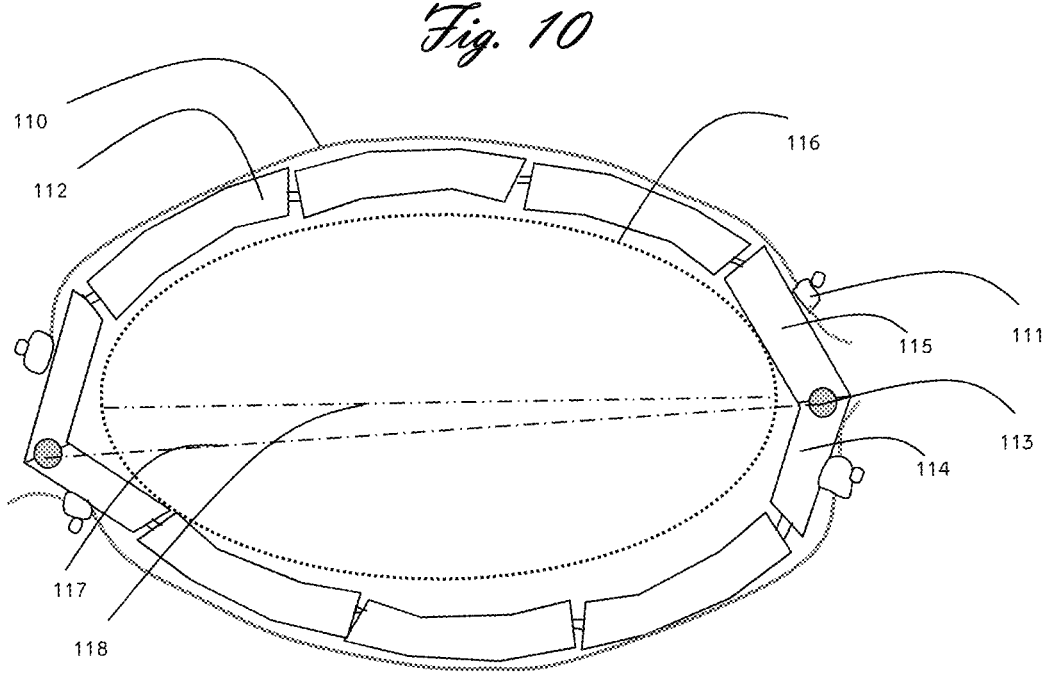
FIG. 11 demonstrates cross section of a 2D-SBC in its loose (or semi-rigid) configuration, according to yet another embodiment of the present invention.

Reference is lastly made to FIG. 11 disclosing in an out-of-scale and non-limiting manner a cross section of a 3D shell-like SBC according to an embodiment of the invention. The SBC of this example comprises two shortanable segments-pressing ligaments (See first ligament 110), which presses segments (see segments 112 at the top portion of the SBC). The ligament is positioned e.g., externally to the segments. A shortening mechanism 111 ensures ligament 110 to be is at least temporarily affixed at a defined measure of tightening to the SBC, all by a means of a simple to operate ligament-shortening member. The SBC of FIG. 11 discloses, inter alia, at least two segments, each of which comprises a hinge 113, in physical connection with at least two rotetable or otherwise maneuverable wings (115, 116). When the SBC is reconfigured from an initial loose state to a arched (tightened) state, the external ligaments, now in their shortened length, are pressing the segments. According to the basic principals of arched-bridges, the segments become close to each other (see final tightened contour of dashed line 116), and a close and secure structure is provided. In this embodiment, like many other 2D- and 3D-SBCs, abutments of at least one first SBC is provided as a basis or a ground to be stabilize upon to abutments of at least one second SBC. One can thus imagine hinges 113 are being common abutments to both upper SBC and lower SBC of FIG. 11.

FIG. 11 also shows the horizontally projected length of the SBC in its initial LOOSE configuration (dashed respectively long line 117) and TIGHTENED configuration (dashed short line 118). The secure tightened arch is provided at short horizontal-projected line.

It is well in the scope of the invention wherein ligaments are tightened in a scalable manner, i.e., in three or more degrees of tension: (i) Loose state, whereas the SBC is flexible and without a clear shape (ii) Semi-tightened state whereas the SBC is somewhat flexible and with a non-rigid defined shape, and (iii) Tightened arched state, whereas the SBC is not flexible and it is well characterized by a clear predetermined secure shape. According to this 'scaled' embodiment, ligament 110, shortening mechanism 111 etc are marked with indicia, indicating the Loose state, Semi-tightened and Tightened states of the SBC. Similarly, the scale may be a four-mode scale (e.g., Solid, Semi-Solid, Safe & Loose mode), ten-steps mode or any other scale or mode.

Figure 12A:
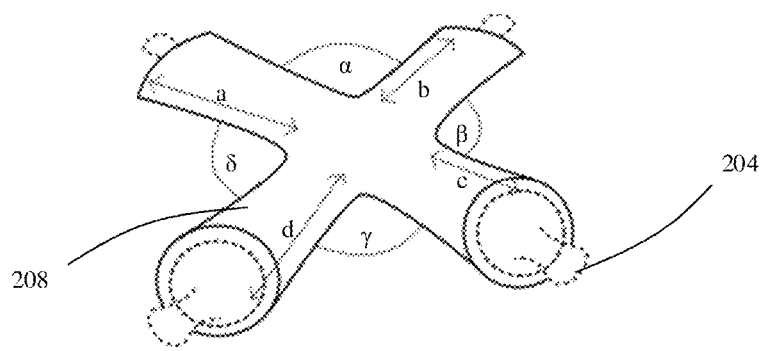
FIGS. 12a-12c illustrate a conjugating means that is adapted to interconnect n segmented binding cords.
Figure 12B:
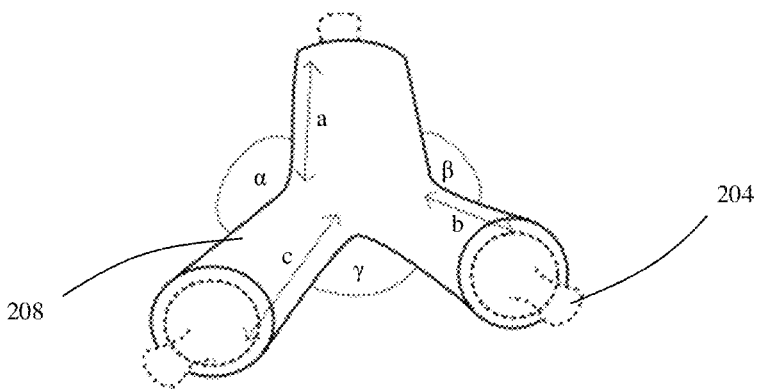
Figure 12C:
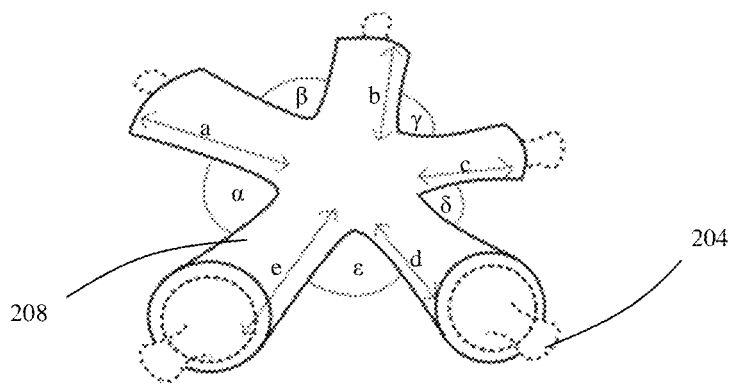

FIG. 12 illustrates a conjugating means 208 which is adapted to interconnect n segmented binding cords, n is an integer greater than 1, enabling the formation of a 3D structure, which can be used as articles of manufacturing securing means or as a helmet, cap, casqued or the like. The 3D structure may comprise m conjugating means; m is an integer equal or greater than 1. The conjugating means is characterized by o arms, o is an integer greater than 1, having arm-length a, b, c, etc. . . . and having arm-distance characterized by angles $\alpha$, $\beta$, $\gamma$, etc. . . . in-between the arms. The arm-lengths and arm-distances can be equal in size or can have any combination of lengths and angles. The conjugating means' arms comprise interlocking means at their ends, which enable the interconnection between the segmented binding cords and the conjugating means. The conjugating means' arms may be flexible or rigid in nature, and may be positioned on the same plane or may be positioned on different planes, such that each arm is curved towards a different direction. The arms of the conjugating means may comprise any male or female interlocking means 204 known in the art. Each of the arms may comprise a different interlocking means, whether male or female, and all arms may have any combination of interlocking means, male or females. The conjugating means may have a curved body or a curved interlocking means 204. FIG. 12a illustrates an embodiment of the conjugating means 208 which is adapted to interconnect four segmented binding cords, through interlocking means 204, enabling the formation of a 3D array. The conjugating means is characterized by arm-lengths a, b, c and d, which may have any combination of lengths. The conjugating means is also characterized by arm-distance of angles $\alpha$, $\beta$, $\gamma$ and $\delta$, which may have any combination of angle size. FIG. 12b illustrates an embodiment of the conjugating means 208 which is adapted to interconnect three segmented binding cords, through interlocking means 204, enabling the formation of a 3D array. The conjugating means is characterized by arm-lengths a, b, and c, which may have any combination of lengths. The conjugating means is also characterized by arm-distance of angles $\alpha$, $\beta$ and $\gamma$, which may have any combination of angle size. FIG. 12c illustrates an embodiment of the conjugating means 208 which is adapted to interconnect five segmented binding cords, through interlocking means 204, enabling the formation of a 3D array. The conjugating means is characterized by arm-lengths a, b, c, d and e which may have any combination of lengths. The conjugating means is also characterized by arm-distance of angles $\alpha$, $\beta$, $\gamma$, $\delta$ and $\epsilon$, which may have any combination of angle size.

What is claimed is:

1. A 3D segmented structure for reversibly and at least partially housing at least one item in a confined volume, comprising:
    two or more elongated segmented binding cords; each of which comprising a plurality of interlockable segments and is characterized by a main longitudinal axis;
    at least one conjugating means comprising at least two arms; said at least one conjugating means is configured for interlocking said two or more elongated segmented binding cords together to form said 3D segmented structure;
    wherein at least one of said elongated segmented binding cords comprises at least one ligament provided along its main longitudinal axis and a ligament-shortening-means, and wherein the effective distance between said segments and/or the effective length of the ligament is reversibly minimizable or otherwise shortenable by said ligament-shortening-means; and
    further wherein upon reversibly minimizing or otherwise shortening said ligament or said effective length by said ligament-shortening-means, said 3D segmented structure is reversibly transformable from a LOOSE (non-arched) configuration to a TIGHTENED (arched) configuration, such that said at least one item is at least partially housed within said 3D segmented structure in said TIGHTENED (arched) configuration.

2. The structure according to claim 1, wherein said 3D segmented structure is characterized by being a 3D flexible and collapsible structure.

3. The structure according to claim 1, wherein said TIGHTENED (arched) configuration forms a structure selected from a group consisting of case-like 3D segmented structure, basket-like 3D segmented structure, container-like 3D segmented structure, suitcase-like 3D segmented structure, a shell-like 3D segmented structure, helmet-like 3D segmented structure and any combination thereof.

4. The structure according to claim 1, wherein at least one of said elongated segmented binding cords further comprises at its ends at least two abutments provided at at least one first end, and at least one second opposite end; each of said abutments is reversibly attachable to a predetermined location.

5. The structure according to claim 1, characterized by said tightened configuration wherein at least two subsequent said interlockable segments are respectively tilted in an angle $\theta$ between; angle $\theta$ is adapted to provide said elongated segmented binding cords with predetermined tighten arched characteristics.

6. The structure according to claim 1, wherein said ligament is made of materials being either flexible or rigid.

7. The structure according to claim 1 wherein said ligament is positioned externally to at least one of said segments.

8. The structure according to claim 1 wherein said ligament is positioned internally to, within and throughout at least one of said segments.

9. The structure according to claim 1, wherein said ligament-shortening-means is configured to provide a predetermined amount of tension applied on said at least one item.

10. The structure according to claim 1, wherein said ligament-shortening-means is a ratchet-like mechanism, especially a mechanism located at one end of at least one of said elongated segmented binding cords.

11. The structure according to claim 1, wherein each of said elongated segmented binding cords comprises at least one interlocking means adapted to connect segments which are adjacent to one another, said at least one interlocking means is selected from the group consisting of cord locks, male-female connecting means, magnetic means, hooks, ratchets, grapples, hook and loop fasteners, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

12. The structure according to claim 1, additionally comprising at least one ligament-securing means adapted to secure said at least one ligament to said at least one elongated segmented binding cord such that unthreading of said at least one ligament is preventable.

13. The structure according to claim 1, wherein said conjugating means is selected from a group consisting of cord locks, male-female connecting means, magnetic means, hooks, ratchets, grapples, hooks-and-loops known as the commercially available Velcro™ product, snaps, buttons, screws, lanyards, magnets, snap hooks, spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

14. The structure according to claim 1, wherein said two or more arms are located on the same plane and/or on different planes.

15. The structure according to claim 1, wherein the length of at least one of said two or more arms is substantially equal or substantially different than another one of said two or more arms.

16. The structure according to claim 1, wherein the angle between at least one pair of said two or more arms is substantially equiangular or substantially non-equiangular to the angle between another pair of said two or more arms.

17. The structure according to claim 1, wherein said at least one ligament is rigid and is selected from the group consisting of polymeric materials, especially nylons, polyamides, plastics, composite materials, stainless steel, metal ware or a combination thereof.

18. The structure according to claim 1, wherein said at least one ligament is flexible and is selected from the group consisting of polymeric materials, plastics, rubbers and rubber-like materials, elastic materials, metallic springs or a combination thereof.

19. A method for reversibly and at least partially housing at least one item in a confined 3D segmented structure comprising steps of:
　a. providing two or more elongated segmented binding cords, each of which is characterized by a main longitudinal axis and comprises a plurality of interlockable segments;
　b. threading a ligament through or along at least two segments of at least one of said two or more elongated segmented binding cords
　c. providing at least one conjugating means; comprising at least two arms; and,
　d. interlocking said two or more elongated segmented binding cords together with said two or more arms of said at least one conjugating means, thereby forming a 3D segmented structure;
　e. providing said elongated segmented binding cords with a ligament-shortening means; and
　f. reversibly minimizing or otherwise shortening said ligament by said ligament-shortening-means to reversibly transforming said 3D segmented structure from a LOOSE (non-arched) configuration to a TIGHTENED (arched) configuration, thereby at least partially housing said at least one item in said 3D segmented structure in said TIGHTENED (arched) configuration.

20. The method according to claim 19, further comprising step of providing said 3D segmented structure as a 3D flexible and collapsible structure.

21. The method according to claim 19, further comprising step of selecting said TIGHTENED (arched) configuration structure from a group consisting of case-like 3D segmented structure, basket-like 3D segmented structure, container-like 3D segmented structure, suitcase-like 3D segmented structure, shell-like 3D segmented structure, helmet-like 3D segmented structure and any combination thereof.

22. The method according to claim 19, wherein said step (f) is characterized by forming a TIGHTENED (arched) configuration structure wherein at least two subsequent segments are respectively tilted in an angle $\theta$ between; angle $\theta$ is adapted to provide said elongated segmented binding cords with predetermined tighten arched characteristics.

23. The method according to claim 19, further comprising the step of locating said at least two arms on the same plane, on different planes or any combination thereof.

24. The method according to claim 19, further comprising the step of setting the length of at least one of said arms to be substantially equal or substantially different than another one of said arms.

25. The method according to claim 19, further comprising the step of setting the angle between at least one pair of said arms to be substantially equiangular or substantially non-equiangular to the angle between another pair of said arms.

26. The method according to claim 19, further comprising steps of:
　a. providing at least one of said elongated segmented binding cords at its ends at least two abutments located at least one first end, and at least one second opposite end; each of said abutments is adapted to reversibly attach a predetermined location;
　b. reversibly affixing said at least two abutments to said predetermined location, thereby securing said at least one elongated binding cord to said predetermined location.

27. The method according to claim 19, further comprising a step of selecting said ligament to be made of materials being either flexible or rigid.

28. The method according to claim 19, wherein said step of threading a ligament is provided by threading said ligament to a position externally to at least one of said segments.

29. The method according to claim 19, wherein said step of threading a ligament is provided by threading said ligament to a position internally to, within and throughout at least one of said segments.

30. The method according to claim 19, further comprising a step of securing said at least one ligament to said at least one elongated segmented binding cord with a ligament-securing means, thereby preventing unthreading of said at least one ligament.

31. The method according to claim 19, further comprising a step of configuring said ligament-shortening-means to provide a predetermined amount of tension applied on said at least one item.

32. The method according to claim 19, wherein said ligament-shortening-means comprises a ratchet-like mechanism, located at one end of at least one of said elongated segmented binding cords.

33. The method according to claim 19, further comprising a step of connecting adjacent segments in said elongated segmented binding cords through interlocking means selected from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, and any combination thereof.

34. The method according to claim 19, wherein said at least one conjugating means is selected from the group consisting of cord locks, male-female connecting means, magnetic means, hooks, ratchets, grapples, hook and loop fasteners, snaps, buttons, screws, lanyards, magnets, snap hooks, spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, and any combination thereof.

35. The method according to claim 19, further comprising step of selecting said ligament to be rigid from a group consisting of polymeric materials, especially nylons, polyamides, plastics, composite materials, stainless steel, metal ware or a combination thereof.

36. The method according to claim 19, wherein said ligament is flexible and is made of a material selected from the group consisting of polymeric materials, plastics, rubbers and rubber-like materials, elastic materials, metallic springs or a combination thereof.

\* \* \* \* \*